United States Patent
Sato

(10) Patent No.: US 12,475,165 B2
(45) Date of Patent: Nov. 18, 2025

(54) COMMUNICATION DEVICE AND METHOD FOR CONTROLLING THE SAME

(71) Applicant: CANON KABUSHIKI KAISHA, Tokyo (JP)

(72) Inventor: Mamoru Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/416,991

(22) Filed: Jan. 19, 2024

(65) Prior Publication Data

US 2024/0160658 A1  May 16, 2024

Related U.S. Application Data

(63) Continuation of application No. PCT/JP2022/023504, filed on Jun. 10, 2022.

(30) Foreign Application Priority Data

Aug. 3, 2021 (JP) .................................. 2021-127731

(51) Int. Cl.
G06F 16/54 (2019.01)
G06F 3/0482 (2013.01)

(52) U.S. Cl.
CPC ............ *G06F 16/54* (2019.01); *G06F 3/0482* (2013.01)

(58) Field of Classification Search
CPC ......... G06F 16/54; G06F 3/0482; H04N 5/76; H04N 5/765; H04N 23/60; H04N 23/63
See application file for complete search history.

(56) References Cited

U.S. PATENT DOCUMENTS 6,927,794 B2   8/2005  Kubo et al.
7,509,025 B2 *  3/2009  Ochiai ............. H04N 21/44218
                                                386/249

(Continued)

FOREIGN PATENT DOCUMENTS

JP   2001-169224 A   6/2001
JP   2005-012387 A   1/2005

(Continued)

OTHER PUBLICATIONS

PCT International Search Report and Written Opinion dated Aug. 9, 2022 (with English translation).

(Continued)

*Primary Examiner* — Angelica Ruiz
(74) *Attorney, Agent, or Firm* — VENABLE LLP

(57) ABSTRACT

A communication device obtains, from a first external device in which a plurality of image data files are recorded, information on the plurality of image data files, provides a screen in which the information on the plurality of image data files is displayed in a selectable manner, obtains, from the first external device, an image data file for which the information has been selected in the screen, and transfers the image data file obtained to a second external device. If the plurality of image data files includes one or more main content files and one or more proxy content files, each of which is a reduced-size version of one of the one or more main content files, the information on the one or more proxy content files in the screen with is displayed with priority over the information on the one or more main content files.

12 Claims, 10 Drawing Sheets

(56) References Cited

U.S. PATENT DOCUMENTS

| | | | |
|---|---|---|---|
| 8,063,953 B2 | 11/2011 | Kojima | |
| 9,686,464 B2 * | 6/2017 | Fujita | H04N 23/633 |
| 10,362,216 B2 | 7/2019 | Shimokura et al. | |
| 10,771,681 B2 | 9/2020 | Shimokura et al. | |
| 2005/0223037 A1 * | 10/2005 | Ahn | G06F 16/40 |
| | | | 707/E17.031 |
| 2007/0058947 A1 | 3/2007 | Yoshida | |
| 2007/0168386 A1 * | 7/2007 | Choi | G11B 27/327 |
| 2007/0269180 A1 * | 11/2007 | Shinkai | G11B 27/322 |
| | | | 386/E5.064 |
| 2009/0100081 A1 * | 4/2009 | Shibuya | G06F 16/58 |
| 2011/0314208 A1 * | 12/2011 | Feinberg | H04L 63/0853 |
| | | | 710/33 |
| 2015/0278243 A1 * | 10/2015 | Vincent | G06F 16/182 |
| | | | 707/634 |

FOREIGN PATENT DOCUMENTS

| | | |
|---|---|---|
| JP | 2006-108730 A | 4/2006 |
| JP | 2007-311885 A | 11/2007 |
| JP | 2008-109630 A | 5/2008 |
| JP | 2012-099889 A | 5/2012 |
| JP | 2012-134809 A | 7/2012 |
| JP | 2018-006806 A | 1/2018 |

OTHER PUBLICATIONS

Japanese Office Action dated Sep. 16, 2025, in related Japanese Patent Application No. 2021-127731.

* cited by examiner

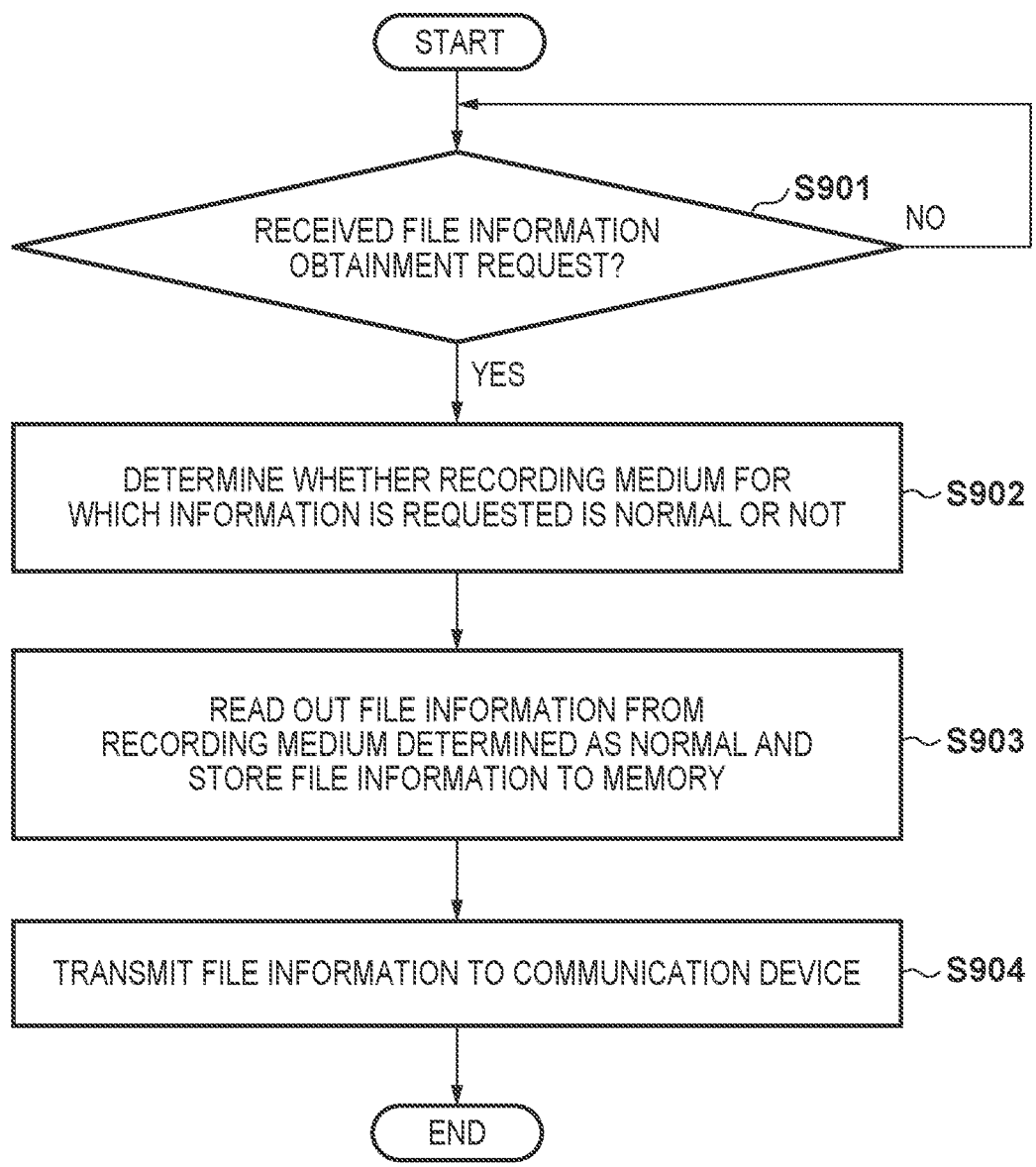

COMMUNICATION DEVICE AND METHOD FOR CONTROLLING THE SAME

CROSS-REFERENCE TO RELATED APPLICATIONS

This application is a Continuation of International Patent Application No. PCT/JP2022/023504, filed Jun. 10, 2022, which claims the benefit of Japanese Patent Application No. 2021-127731, filed Aug. 3, 2021, both of which are hereby incorporated by reference herein in their entirety.

BACKGROUND OF THE INVENTION

Field of the Invention

The present invention relates to a communication device and a method for controlling the same.

Background Art

A communication device which has a function for obtaining an image file recorded by an image capture apparatus and transferring the image file to a server is known. If the image capture apparatus has a plurality of slots for mounting removable recording media (PTL 1), the communication device can select a recording medium or slot from which to read out the image file.

CITATION LIST

Patent Literature

PTL 1: Japanese Patent Laid-Open No. 2001-169224

SUMMARY OF THE INVENTION

However, conventional communication devices have been configured to always select a specific slot first. As such, if a user wishes to obtain an image file from a slot which is not selected first, the user must reselect the slot. Furthermore, if the user does not know or has forgotten the slot in which an image file in a format they wish to obtain is recorded, the user must select an individual slot and display a list of image files.

The present invention in one aspect provides a communication apparatus, and a method of controlling the same, which is capable of obtaining image files from an image capture apparatus, and which improves usability by improving one or more such problems with conventional techniques.

According to an aspect of the present invention, there is provided a communication device comprising: one or more processors that execute a program stored in a memory and thereby function as: an information obtaining unit configured to obtain, from a first external device in which a plurality of image data files are recorded, information on the plurality of image data files; a display control unit configured to provide a screen in which the information on the plurality of image data files is displayed in a selectable manner; a data obtaining unit configured to obtain, from the first external device, an image data file for which the information has been selected in the screen; and a transfer unit configured to transfer the image data file obtained to a second external device different from the first external device, wherein in a case where the plurality of image data files include one or more main content files and one or more proxy content files each corresponding to one of the one or more main content files, the display control unit displays the information on the one or more proxy content files in the screen with priority over the information on the one or more main content files.

According to another aspect of the present invention, there is provided a method of controlling the communication device, comprising: obtaining, from a first external device in which a plurality of image data files are recorded, information on the plurality of image data files; providing a screen in which the information on the plurality of image data files is displayed in a selectable manner; obtaining, from the first external device, an image data file for which the information has been selected in the screen; and transferring the image data file obtained to a second external device different from the first external device, wherein the providing comprises, in a case where the plurality of image data files include one or more main content files and one or more proxy content files each corresponding to one of the one or more main content files, providing the screen in which the information on the one or more proxy content files is displayed with priority over the information on the one or more main content files.

According to a further aspect of the present invention, there is provided a non-transitory computer-readable medium that stores a program which, when executed by one or more processors of a communication device, causes the one or more processors to perform a method of controlling the communication device, comprising: obtaining, from a first external device in which a plurality of image data files are recorded, information on the plurality of image data files; providing a screen in which the information on the plurality of image data files is displayed in a selectable manner; obtaining, from the first external device, an image data file for which the information has been selected in the screen; and transferring the image data file obtained to a second external device different from the first external device, wherein the providing comprises, in a case where the plurality of image data files include one or more main content files and one or more proxy content files each corresponding to one of the one or more main content files, providing the screen in which the information on the one or more proxy content files is displayed with priority over the information on the one or more main content files.

According to another aspect of the present invention, there is provided a communication device that communicates with an image capture apparatus that records content files into a first recording medium with priority over a second recording medium, the communication device comprising: one or more processors that execute a program stored in a memory and thereby function as: a display unit configured to, when displaying content recorded in the first recording medium and the second recording medium, display a content recorded in the first recording medium with priority over a content recorded in the second recording medium.

According to a further aspect of the present invention, there is provided a method for controlling a communication device that communicates with an image capture apparatus that records content files into a first recording medium with priority over a second recording medium, comprising: displaying, when displaying content recorded in the first recording medium and the second recording medium, a content recorded in the first recording medium with priority over a content recorded in the second recording medium.

According to another aspect of the present invention, there is provided a non-transitory computer-readable medium that stores a program which, when executed by one or more processors of a communication device, causes the one or more processors to perform a method of controlling the communication device, comprising: displaying, when displaying content recorded in the first recording medium and the second recording medium, a content recorded in the first recording medium with priority over a content recorded in the second recording medium.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 9 is a flowchart pertaining to operations of the image capture apparatus 100.

DESCRIPTION OF THE EMBODIMENTS

Figure 1:
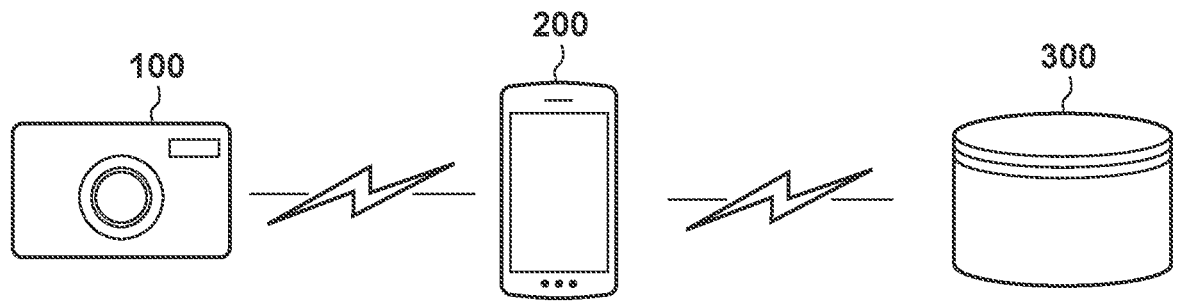
FIG. 1 is a schematic diagram illustrating an example of the configuration of an image transfer system according to embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The following will describe embodiments of a configuration in which the present embodiment is implemented in a smartphone, which is an example of a communication device. However, the present invention can be applied in any electronic device capable of communicating with two or more external devices including an image capture apparatus, such as a computer device (a personal computer, a tablet, a media player, a PDA, or the like), a game console, a robot, or the like. These are merely examples, however, and the present invention can be applied in other electronic devices as well.

First Embodiment

<Image Transfer System>

FIG. 1 is a diagram schematically illustrating an example of the configuration of an image transfer system including a communication device according to embodiments of the present invention. The image transfer system includes an image capture apparatus 100, a communication device 200, and an information processing device 300. The image capture apparatus 100 (a first external device) is typically a digital camera or a digital video camera. In the present embodiment, the communication device 200 is a smartphone or tablet. The information processing device 300 (a second external device) is a server device or cloud storage that stores image files.

The image capture apparatus 100 and the information processing device 300 both communicate with the communication device 200. The image capture apparatus 100 and the communication device 200 can communicate over a wired connection using a cable, or over a wireless connection, for example. The communication device 200 and the information processing device 300 are also capable of communicating over a connection over a mobile communication network such as 4G or 5G, over the Internet, or the like.

Note that the communication protocol between the image capture apparatus 100 and the communication device 200, and the communication protocol between the communication device 200 and the information processing device 300, are not particularly limited. A publicly-known communication protocol can be used for each. PTP (Picture Transfer Protocol) or PTP-IP (PTP over TCP/IP networks) can be used, for example, when transferring image files from the image capture apparatus 100 to the communication device 200. FTP (File Transfer Protocol) can also be used when transferring image files from the communication device 200 to the information processing device 300.

Note that in the example illustrated in FIG. 1, the image capture apparatus 100 and the information processing device 300 are located on separate communication networks. However, the image capture apparatus 100, the communication device 200, and the information processing device 300 may be located on the same network provided by the same access point, for example. However, even in this case, the image file is transferred from the image capture apparatus 100 to the information processing device 300 via the communication device 200.

<Configuration of Image Capture Apparatus 100>

Figure 2A:
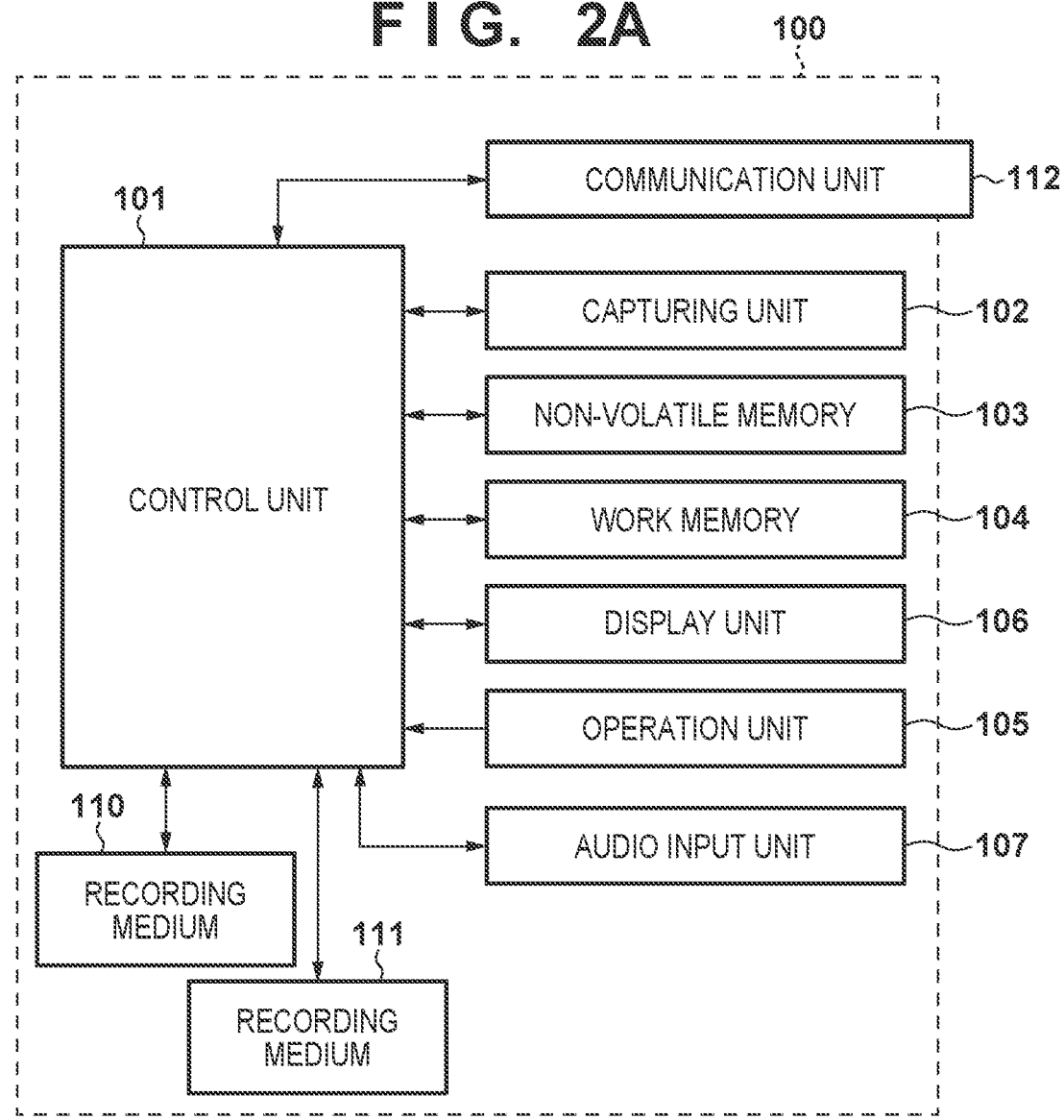
FIG. 2A is a block diagram illustrating an example of the functional configuration of an image capture apparatus 100 according to embodiments.

FIG. 2A is a block diagram illustrating an example of the hardware configuration of the image capture apparatus 100.

A control unit 101 includes, for example, one or more microprocessors ("MPUs" hereinafter). The control unit 101 implements the functions of the image capture apparatus 100 by loading a program stored in a non-volatile memory 103, for example, into a work memory 104 and executing the program using the MPU to control the operations of the respective blocks illustrated in FIG. 2A. Note that at least some of the control for implementing the functions of the image capture apparatus 100 may be implemented using hardware circuitry such as ASICs, FPGAs, or the like.

A capturing unit 102 includes an image forming optical system having (i) a lens unit including a movable lens such as a focus lens and an aperture stop and (ii) a driving mechanism for the movable lens and the aperture stop, and also includes an image sensor. The image sensor includes a plurality of pixels arranged two-dimensionally. Each pixel is provided with a photoelectric conversion element, which is a photodiode, for example. The image sensor converts an optical image formed by the lens unit into a pixel signal group (an analog image signal) using the plurality of pixels. The image sensor may be a CMOS (Complementary Metal Oxide Semiconductor) image sensor, a CCD (Charge Coupled Device), or the like, for example. The capturing unit 102 performs A/D conversion, noise reduction processing, and the like on the analog image signal generated by the image sensor, and outputs that signal as image data.

A control unit 101 generates display image data and recording image data by applying predetermined image processing to image data output by the capturing unit 102. The display image data is used for display in a display unit 106, for example. The recording image data is recorded into at least one of recording media 110 and 111. The control unit 101 can also generate evaluation values used in automatic focus detection (AF) and automatic exposure control (AE) from image data, and execute the AF and AE based on the evaluation values.

The non-volatile memory 103 is electrically rewritable, and stores programs executed by the control unit 101, settings of the image capture apparatus 100, GUI data, meta-template information, and the like.

The work memory 104 is used as a buffer memory for temporarily holding image data, a system memory for executing programs, a video memory for a display unit 106, and the like.

"Operation unit 105" is a collective name for input devices that accept instructions made in the image capture apparatus 100. The operation unit 105 may include switches, buttons, keys, dials, a joystick, a touch panel, and the like. The input devices are named according to the functions assigned thereto. For example, there is a power button through which the user instructs the power of the image capture apparatus 100 to be turned on and off, a release switch for instructing the start/stop of shooting, a playback button for instructing the playback of moving image data, and the like. Note that different functions can be assigned to the same input device in accordance with an operation state of the image capture apparatus 100. The operation unit 105 also includes a connect button for starting communication with an external device through a communication unit 112 (described later), a touch panel provided on the display unit 106 (described later), and the like.

The display unit 106 displays live view images, shot image data, menu screens, information on the image capture apparatus 100, and the like. Note that the display unit 106 may be a display device external to the image capture apparatus 100.

An audio input unit 107 is a microphone, for example, and is used for obtaining ambient sound when shooting a moving image for recording. Audio converted into an electrical signal by the audio input unit 107 is converted into audio data in a predetermined format by the control unit 101, and is recorded into the recording medium 110 and/or 111 as an audio file.

The recording media 110 and 111 are used as recording destinations for the image data and the audio data obtained from shooting. At least one of the recording media 110 and 111 may be removable from the image capture apparatus 100. The recording media 110 and 111 are typically memory cards.

In a case where a recording medium which is removable from the image capture apparatus 100 is used, the image capture apparatus 100 is provided with a mechanism from which the recording medium can be removed and which is used to access a mounted recording medium. In a case where the recording medium is a memory card, this mechanism is called a memory slot. The present embodiment assumes that the recording media 110 and 111 are memory cards, and that the image capture apparatus 100 has two memory slots.

The communication unit 112 is an interface for communicating with external devices. The communication unit 112 includes an antenna and a communication module. The communication unit 112 can have separate communication interfaces for each communication standard supported. The image capture apparatus 100 can communicate with an external device such as the communication device 200 through a wired connection and/or wireless connection established through the communication unit 112. For example, moving image data and audio data obtained through shooting can be transmitted to the external device through the communication unit 112. The present embodiment assumes that the image capture apparatus 100 and the communication device 200 communicate over a wireless connection.

Note that the present embodiment assumes that the communication unit 112 has a wireless LAN interface compliant with one or more of the IEEE 802.11 series standards. It is also assumed that the communication unit 112 has a USB interface compliant with one of the USB (Universal Serial Bus) standards. The control unit 101 communicates with the external device connected to the communication interface by controlling the communication interface of the communication unit 112.

Note that the wireless LAN interface of the communication unit 112 has an access point mode (AP mode) for operating as an access point and a client mode (CL mode) for operating as a client in infrastructure mode. The operation mode of the communication unit 112 is controlled by the control unit 101. By operating the communication unit 112 in CL mode, the image capture apparatus 100 operates as a client in infrastructure mode. When operating as a client, the image capture apparatus 100 can join a network formed by a nearby access point by connecting to the access point.

In addition, by operating the communication unit 112 in AP mode, the image capture apparatus 100 operates as a simple access point (simple AP). Simple APs have more limited functions than regular APs. Specifically, a client does not have a gateway function for transferring data received from the client to an external network. When operating as a simple AP, the image capture apparatus 100 forms a network. A device in the vicinity of the image capture apparatus 100 can recognize the image capture apparatus 100 as an access point and join the network formed by the image capture apparatus 100. Because the image capture apparatus 100 is a simple AP, data received from the client cannot be transferred to an external network such as the Internet.

Figure 2B:
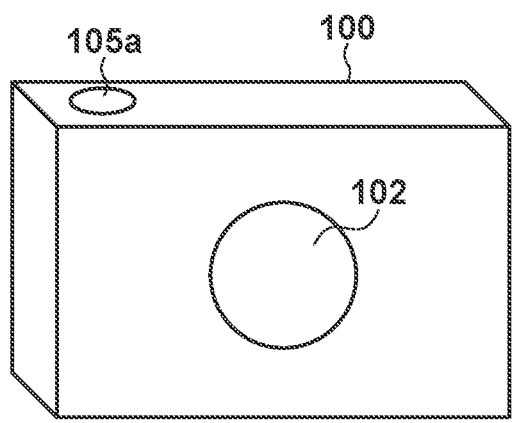
FIG. 2B is a perspective view illustrating an example of the external appearance of a front side of the image capture apparatus 100 according to embodiments.
Figure 2C:
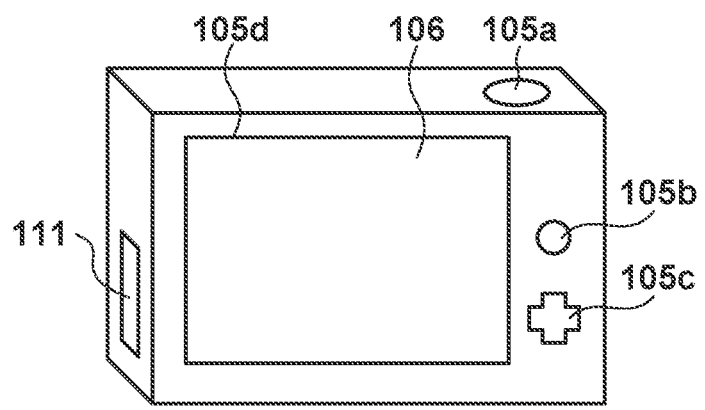
FIG. 2C is a perspective view illustrating an example of the external appearance of a rear side of the image capture apparatus 100 according to embodiments.

FIGS. 2B and 2C are perspective views illustrating an example of the external appearance of the image capture apparatus 100. FIG. 2B illustrates an example of the external appearance from the front side (a subject side), and FIG. 2C illustrates an example of the appearance from the rear side (a photographer side). A release switch 105a, a playback button 105b, a directional key 105c, and a touch panel 105d are input devices included in the operation unit 105. The display unit 106 can be caused to function as a viewfinder by displaying a live view image in the display unit 106 when standing by to shoot, when shooting a moving image for recording, and the like.

<File Structure of Recording Media 110 and 111>

Figure 3:
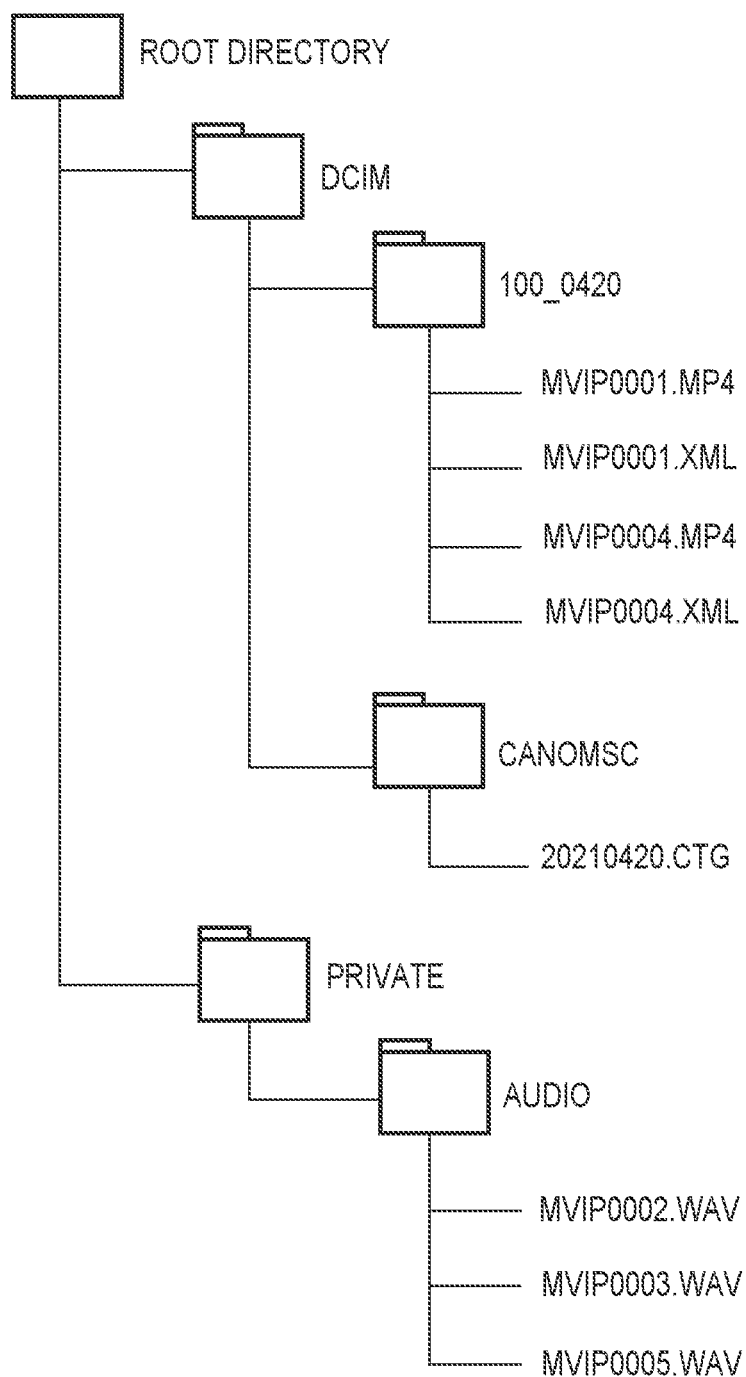
FIG. 3 is a diagram illustrating an example of the file structure of the image capture apparatus 100.

The file structure of the recording medium 110 will be described next using FIG. 3. The file structure is the same for the recording medium 111.

It is assumed that the interior of the recording medium 110 is formatted using a file system, such as exFAT (Extended File Allocation Table), that can be referenced from various operating systems.

The control unit 101 records the moving image data generated by the capturing unit 102 in MP4 file format in a directory for each date (here, "100_0420" (with the final four characters indicating the date at the time of recording), which is provided in a directory "DCIM" directly under the root directory. The control unit 101 also records metadata information of the moving image data in XML (Extensible Markup Language) file format based on the meta-template information read out from the non-volatile memory 103. The metadata information is information in which, for example, information such as categories, titles, comments, and the like of the moving image data is recorded in association with tags in the XML file, and is used for managing the moving image data and the like.

The control unit 101 records the audio data generated by the audio input unit 107 when shooting the moving image in WAV file format in a directory "AUDIO" provided in a "PRIVATE" directory directly under the root directory.

The control unit 101 also generates a catalog file for file management in a "CANOMSC" directory provided in the "DCIM" directory when moving image data and audio data are generated by the capturing unit 102 and the audio input unit 107. If a catalog file already exists, the control unit 101 updates the existing catalog file. Information on the files recorded in the recording medium 110 (a recording date/time, for example) is recorded in the catalog file.

Although only the data recorded when shooting a moving image is described here, still image files can also be recorded in the same directory as the moving image data. The file formats of the moving image data, audio data, and the like described here are merely examples, and these items may be recorded in other file formats as well.

<Hardware Configuration of Communication Device 200>

Figure 4:
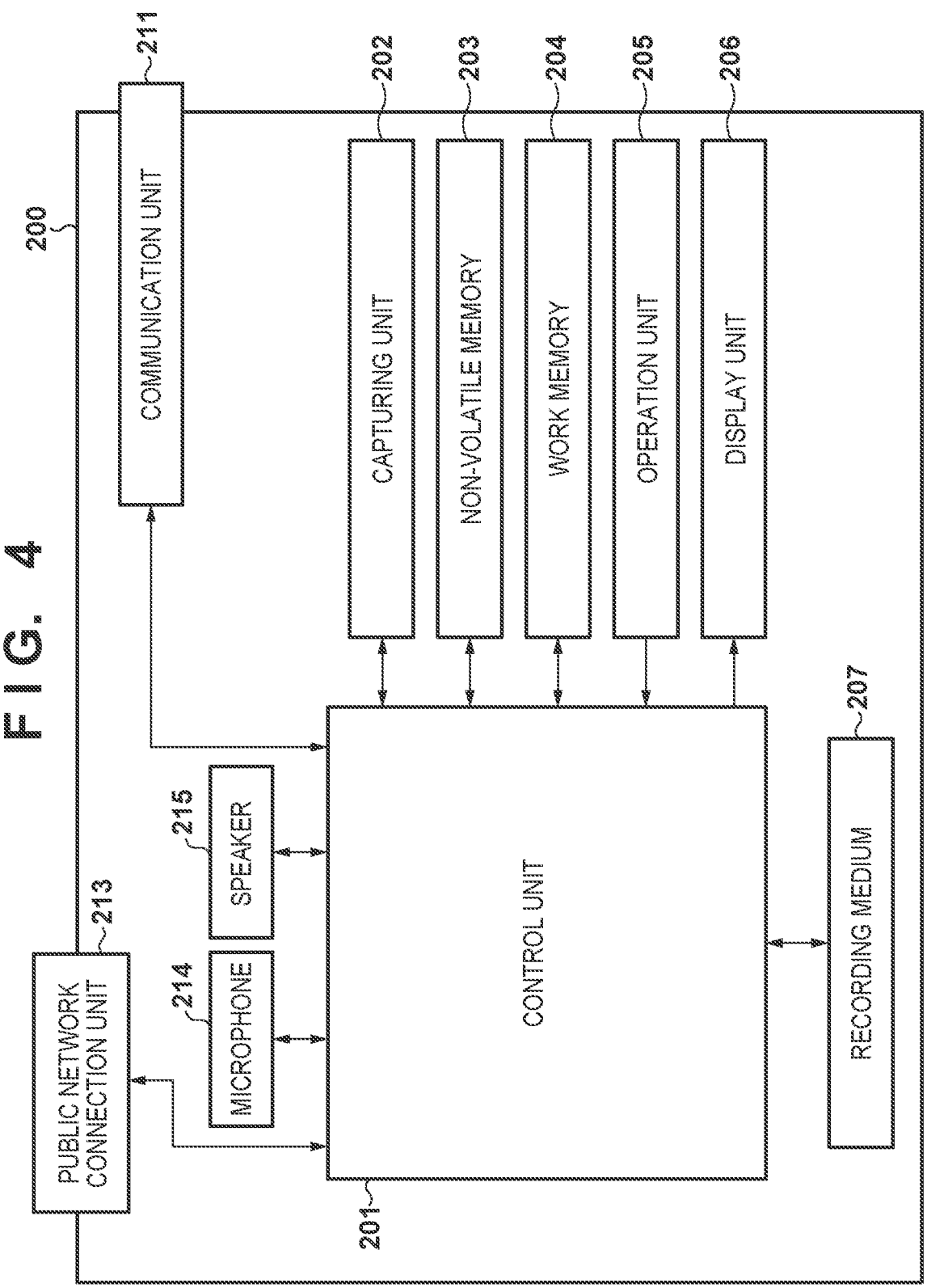
FIG. 4 is a block diagram illustrating an example of the configuration of a communication device 200 according to embodiments.

FIG. 4 is a block diagram illustrating an example of the hardware configuration of the communication device 200. It is assumed here that the communication device 200 is a mobile computing device terminal (e.g., a smartphone, tablet, or the like) capable of connecting to a mobile phone network.

A control unit 201 includes, for example, one or more microprocessors ("MPUs" hereinafter). The control unit 201 implements the functions of the communication device 200 by loading a program stored in a non-volatile memory 203, for example, into a work memory 204 and executing the program using the MPU to control the operations of the respective blocks illustrated in FIG. 4. Note that at least some of the control for implementing the functions of the communication device 200 may be implemented using hardware circuitry such as ASICs, FPGAs, or the like.

A capturing unit 202 includes an image forming optical system having (i) a lens unit including a movable lens such as a focus lens and (ii) a driving mechanism for the movable lens, and also includes an image sensor. The image sensor includes a plurality of pixels arranged two-dimensionally. Each pixel is provided with a photoelectric conversion element, which is a photodiode, for example. The image sensor converts an optical image formed by the lens unit into a pixel signal group (an analog image signal) using the plurality of pixels. The image sensor may be a CMOS image sensor, a CCD, or the like, for example. The capturing unit 202 performs A/D conversion, noise reduction processing, and the like on the analog image signal generated by the image sensor, and outputs that signal as image data.

The control unit 201 generates display image data and recording image data by applying predetermined image processing to image data output by the capturing unit 202. The display image data is used for display in a display unit 206, for example. The image data for recording is recorded into a recording medium 207. The control unit 201 can also generate evaluation values used in automatic focus detection (AF) and automatic exposure control (AE) from image data, and execute the AF and AE based on the evaluation values.

The non-volatile memory 203 is electrically rewritable, and stores programs executed by the control unit 201, settings of the communication device 200, GUI data, meta-template information, and the like. The program includes basic software (an OS) and application programs that run in cooperation with the OS.

The present embodiment assumes that the following application programs are stored in the non-volatile memory 203:
    a transfer application program (transfer app) that provides a data transfer function using communication with the image capture apparatus 100 and the information processing device 300
    a file management application (file management app) that manages the data files received from the image capture apparatus 100
    an image management application program (image management app)

The work memory 204 is used as a buffer memory for temporarily holding image data, a system memory for executing programs, a video memory for the display unit 206, and the like.

"Operation unit 205" is a collective name for input devices that accept instructions made in the communication device 200. The operation unit 205 may include switches, buttons, a touch panel provided on the display unit 206, and the like. Note that a function for making instructions to the communication device 200 through voice input using a microphone 214 is also considered to be one of the input devices provided in the operation unit 205.

The display unit 206 displays live view images, shot image data, menu screens, information on the communication device 200, and the like. Note that the display unit 206 may be a display device external to the communication device 200.

The recording medium 207 is used as a recording destination for the image data and the audio data obtained from shooting. The recording medium 207 may be removable from the communication device 200. The recording medium 207 is typically a memory card.

A communication unit 211 is an interface for communicating with external devices. The communication unit 211 can have separate communication interfaces for each communication standard supported. The communication device 200 can communicate with external devices such as the image capture apparatus 100 and the information processing device 300 through a wired connection and/or wireless connection established through the communication unit 211. The present embodiment assumes that the communication device 200 communicates with the image capture apparatus 100 and the information processing device 300 through a wireless connection.

Note that the present embodiment assumes that the communication unit 211 has a wireless LAN interface compliant with one or more of the IEEE 802.11 series standards. It is also assumed that the communication unit 211 has a USB interface compliant with one of the USB (Universal Serial Bus) standards. The communication unit 211 can include a wireless communication module such as an infrared communication interface, a Bluetooth (registered trademark) communication interface, a wireless USB interface, or the like. The control unit 201 communicates with the external device connected to the communication interface by controlling the communication interface of the communication unit 211.

The communication device 200 may communicate directly with the image capture apparatus 100 and the information processing device 300, or may communicate via other devices such as access points, repeaters, or the like. PTP/IP (Picture Transfer Protocol over Internet Protocol) through wireless LAN, for example, can be used as the image data communication protocol.

Note that the wireless LAN interface of the communication unit 211 may have an access point mode (AP mode) for operating as an access point and a client mode (CL mode) for operating as a client in infrastructure mode. The operation mode of the communication unit 211 is controlled by the control unit 201. By operating the communication unit 211 in CL mode, the communication device 200 operates as a client in infrastructure mode. When operating as a client, the communication device 200 can join a network formed by a nearby access point by connecting to the access point.

A public network connection unit 213 is a communication interface used for connecting to a mobile phone network. The communication device 200 provides a function for making voice calls with external devices through the public network connection unit 213. A user can make a call with a user of an external device using the microphone 214 and a speaker 215.

Because the mobile phone network provides a data communication function, the communication device 200 can also communicate data with external devices such as the information processing device 300 through the public network connection unit 213. Note that the same antenna may be used for the wireless communication interface of the communication unit 211 and the public network connection unit 213, or separate antennas may be used. Note that in a case where both the communication unit 211 and the public network connection unit 213 can be used for communicating with the same external device, the unit providing the faster communication speed can be used for communication when not making voice calls. Here, the communication speed may be a theoretical communication speed or a communication speed in a real environment.

The microphone 214 is used for obtaining ambient sound when shooting a moving image for recording. Audio converted into an electrical signal by the microphone 214 is converted into audio data in a predetermined format by the control unit 201, and is recorded into the recording medium 207 as an audio file. The microphone 214 is also used to input audio for voice calls through the public network connection unit 213.

The speaker 215 is used for outputting audio generated or played back by the OS and applications, outputting audio received through the public network connection unit 213, and the like.

<Software Configuration of Communication Device 200>

Figure 5:
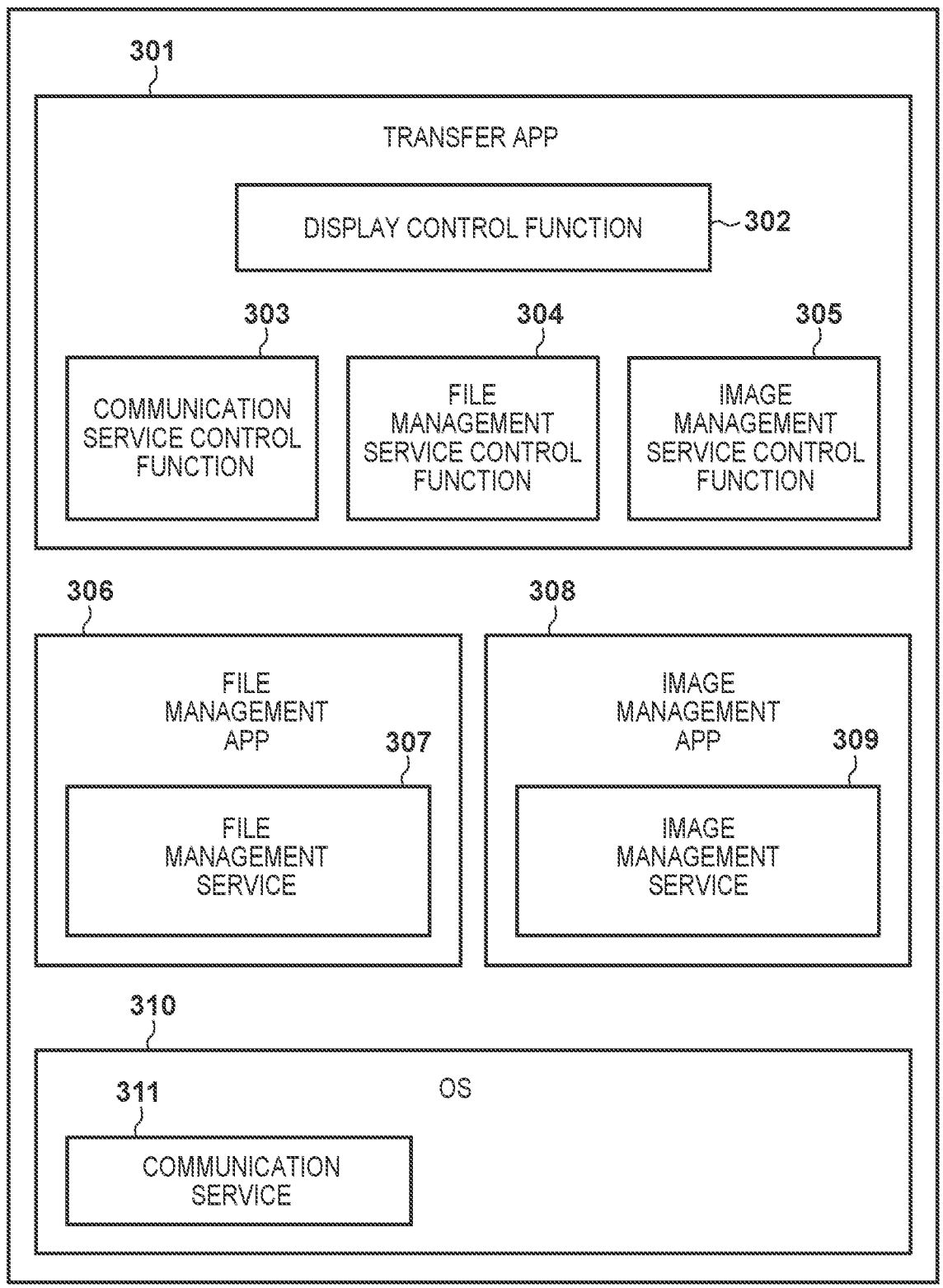
FIG. 5 is a diagram illustrating an example of the software configuration of the communication device 200.

An example of the software configuration of the communication device 200 will be described next with reference to FIG. 5. FIG. 5 schematically illustrates programs stored in the non-volatile memory 203.

An OS 310, a file management application (app) 306, an image management app 308, and a transfer app 301 are recorded and stored in the non-volatile memory 203. The transfer app 301 provides a function for obtaining data files from the image capture apparatus 100 and transferring the data files to the information processing device 300. These applications 301, 306, and 308 are assumed to be installed in the communication device 200 through a publicly-known method.

When the power switch in the operation unit 205 of the communication device 200 is turned on, power is supplied to each part of the communication device 200 from a power source, and start-up operations of the communication device 200 are started. In the start-up operations, the control unit 201 reads out the OS 310 from the non-volatile memory 203 to the work memory 204 and executes the OS 310.

The applications 301, 306, and 308 can be executed when the communication device 200 starts up. For example, when an icon of the application 301, 306, or 308 displayed in the display unit 206 is tapped, the control unit 201 executes the tapped application.

In the following descriptions, operations implemented by the control unit 201 executing the OS, the application programs, and the like will be described assuming one of the control unit 201, the OS, and the application as the main entity of the operations.

The OS 310 provides a function for controlling the various units of the communication device 200. The OS 310 also provides various services to applications. For example, in the present embodiment, a function pertaining to communication with external devices is implemented by a communication service 311 provided by the OS 310.

The communication service 311 controls whether the communication function is on or off, connections with the external devices, and data communication with connected external devices. The communication service also controls the provision of data obtained through the communication function to apps and the transmission/reception of data to/from external devices in response to requests from apps.

The file management app 306 provides a file management service 307 for managing a list of data files recorded in the recording medium 207. The file management app 306 also controls the readout of data files managed by the file management service 307 from the recording medium 207 and the writing of data files to the recording medium 207 in response to requests from other applications.

The image management app 308 provides an image management service 309 for managing a list of image data files (still image and moving image data files) recorded in the recording medium 207. Unlike the file management app 306, the image management app 308 provides functions specialized for managing image data, such as a function for displaying thumbnail images of image data files in a list in the display unit 206, a function for moving through frames of moving image files, and the like.

The image management app 308 also controls the readout of image data files that are managed by the image management service 309 from the recording medium 207 and controls the writing of image data files to the recording medium 207 in response to requests from other applications.

It is assumed that the data files managed by the file management app 306 and the image data files managed by the image management app 308 are managed in independent areas within the recording medium 207, and thus cannot be cross-referenced.

The transfer app 301 will be described next. The transfer app 301 includes a display control function 302, a communication service control function 303, a file management service control function 304, and an image management service control function 305 as functions to be provided. The display control function 302 generates screens to be displayed in the display unit 206. The configurations of the screens will be described later.

The communication service control function 303 of the transfer app 301 communicates with the image capture apparatus 100 using the communication service 311 provided by the OS 310. Specifically, the communication service control function 303 obtains information on a list of data files, individual file information, data files, and so on held by the image capture apparatus 100, from the image capture apparatus 100 using the communication service 311. The communication service control function 303 also reads out the data files stored in the recording medium 207 and transmits the data files to the information processing device 300 using the communication service 311.

The file management service control function 304 of the transfer app 301 stores data files, which are stored in the work memory 204, in the recording medium 207 using the file management service 307 provided by the OS 310.

The image management service control function 305 of the transfer app 301 stores image data files, which are stored in the work memory 204, in the recording medium 207 using the image management service 309 provided by the OS 310.

<Use of Plurality of Recording Media in Image Capture Apparatus 100>

The image capture apparatus 100 has a function for generating and recording two types of data having different data amounts in a single shot. The image data having different data amounts may be, for example, data in which one or more of a resolution, a bit rate, a framerate, a color depth, and an encoding method is different. In the case of moving image data, the data amounts of accompanying audio data may be different as well.

Of the two types of data, data having a large data amount will be referred to as main content, and data having a smaller data amount than the main content will be referred to as proxy content. The proxy content requires less time for transmission, image processing, and the like than the main content, and thus the main content is suitable for applications in which higher image quality and sound quality are required, whereas the proxy content is suitable for applications in which the processing time is prioritized.

For example, in the case of moving image data (including audio data; the same applies hereinafter) used in news programs, in a case where it is necessary to send the video in real time from the site and immediacy is required, proxy content is more suitable than main content. On the other hand, in a case where image quality and sound quality are prioritized over immediacy, the main content is more suitable.

However, recording only proxy content makes it impossible to handle situations where high-quality data becomes necessary at a later date, and it is therefore advantageous to record main content as well. The image capture apparatus 100 therefore has a function for recording main content and proxy content separately. It is also possible to set whether to record a metadata file in addition to the main content and the proxy content.

In a case where recording both main content and proxy content, the proxy content can be generated by first generating the main content and then reducing the data amount in the main content (lowering the bitrate). Note that the present invention does not depend on the methods for generating the main content and proxy content, and thus the main content and the proxy content can be generated through any method.

The image capture apparatus 100 also has a continuous recording function for continuously recording moving images immediately after the image capture apparatus 100 is started up. It is also possible to set whether or not to record a metadata file for moving image data shot using the continuous recording function.

Figure 6:
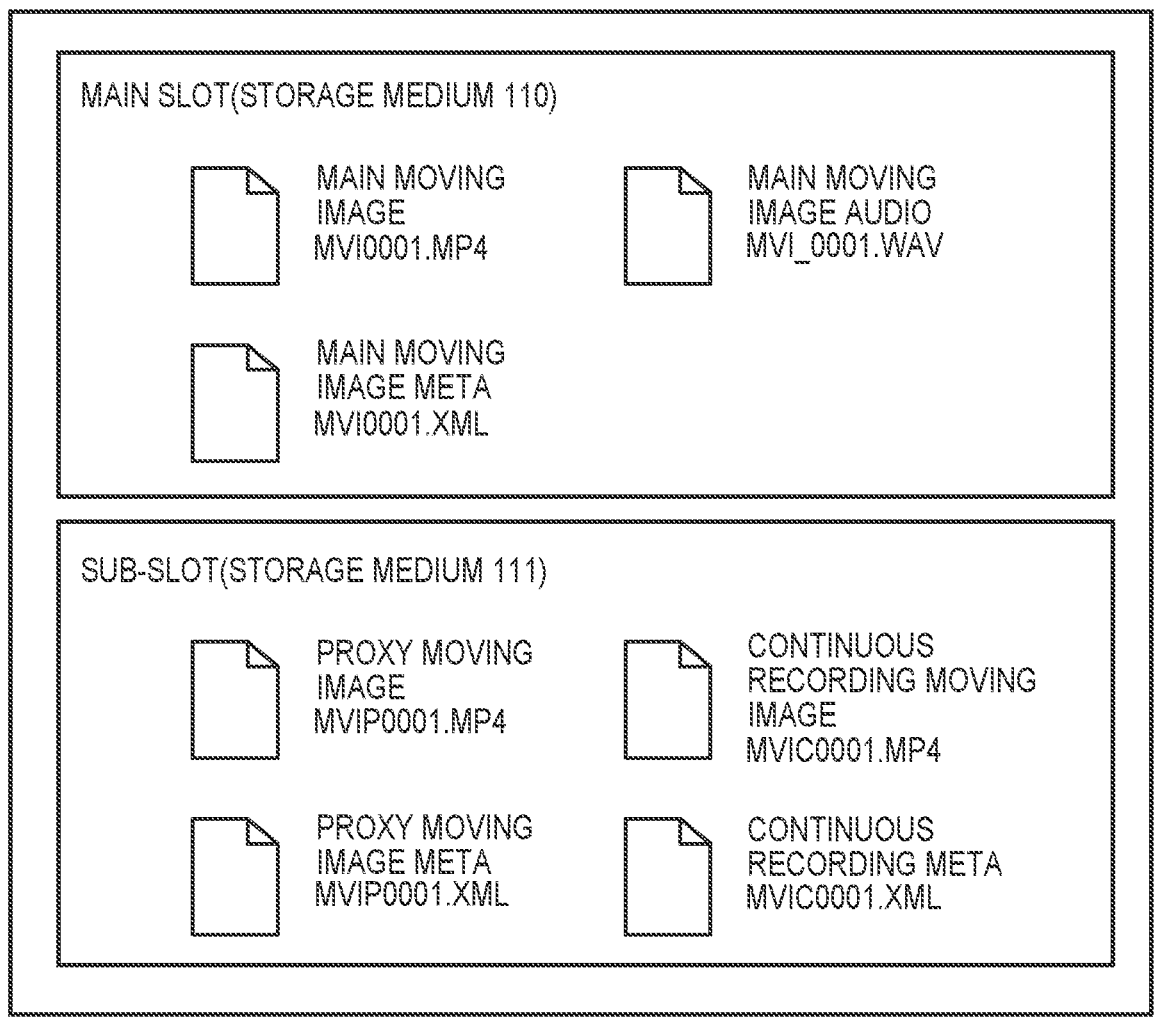
FIG. 6 is a diagram illustrating an example of a recording rule for content files in the image capture apparatus 100.

FIG. 6 schematically illustrates files recorded in individual recording media in a case where the image capture apparatus 100 can use the recording media 110 and 111 and settings for recording both main content and proxy content are made. Here, the recording media 110 and 111 are both removable from the image capture apparatus 100, with the slot in which the recording medium 110 is mounted being a main slot and the slot in which the recording medium 111 is mounted being a sub-slot.

The control unit 101 determines the recording medium in which to record the data based on recording settings saved in the non-volatile memory 103. The recording settings include the data format or type of content to be recorded in the recording medium mounted in each slot, whether a metadata file needs to be recorded, and the like. For example, settings for saving main content in the main slot and recording proxy content in the sub-slot, settings for saving main content in the main slot and saving slow-motion video in the sub-slot, and the like can be made. Basically, main content (including metadata) is recorded in the main slot. Furthermore, it is assumed that data which is different from the main content and which is recorded simultaneously (in parallel) with the main content, such as sub-content (including metadata), is recorded in the sub-slot.

It is assumed that in a case where only one of the recording media 110 and 111 is mounted, the main content is recorded in the mounted recording medium. A recording medium that is mounted but in which data cannot be written due to an anomaly or protection will be treated as not being mounted.

<Descriptions of Screens>

The transfer app 301 will be described in detail next. FIG. 7 is a diagram illustrating an example of an operation screen generated by the display control function 302 of the transfer app 301 and displayed in the display unit 206. It is assumed here that the transfer app 301 displays the main slot (recording medium 110) as "SD A" and the sub-slot (recording medium 111) as "SD B".

The communication unit 112 of the image capture apparatus 100 is assumed to be operating in AP mode to form a network. When the transfer app 301 is launched, the communication unit 211 connects to the communication unit 112, which is operating as an access point. Note that the information necessary for connecting to the access point (an SSID and a password) is assumed to be set in advance and stored in the non-volatile memory 203.

Figure 7A:
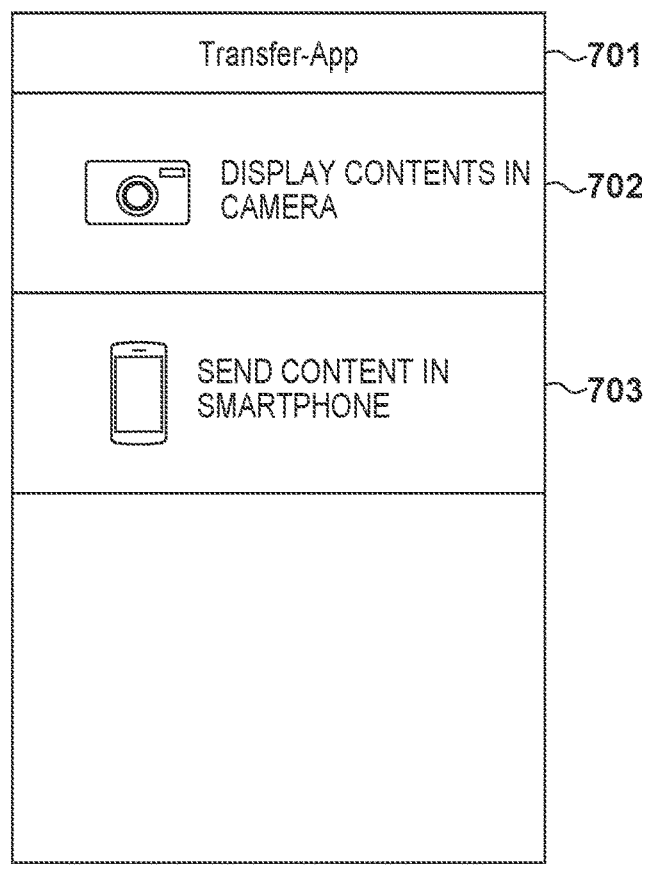
FIG. 7A is a diagram illustrating an example of a display screen of a transfer app run on the communication device 200.

FIG. 7A illustrates an example of a function selection screen 701 displayed as an initial screen of the transfer app 301 in a state where a wireless connection is established between the communication device 200 and the image capture apparatus 100. The function selection screen 701 includes a button 702 for selecting the display of data files present in the image capture apparatus 100 and a button 703 for selecting the display of data files present in the recording medium 207 of the communication device 200.

When the button 702 is tapped, the communication service control function 303 communicates with the image capture apparatus 100 and obtains information on the data files present in the image capture apparatus 100. Based on the information obtained by the communication service control function 303, the display control function 302 generates a file list display screen. When the button 703 is tapped, the image management service control function 305 obtains information on the image data files present in the recording medium 207 using the image management service 309. Based on the information obtained by the image management service control function 305, the display control function 302 generates a file list display screen.

Figure 7B:
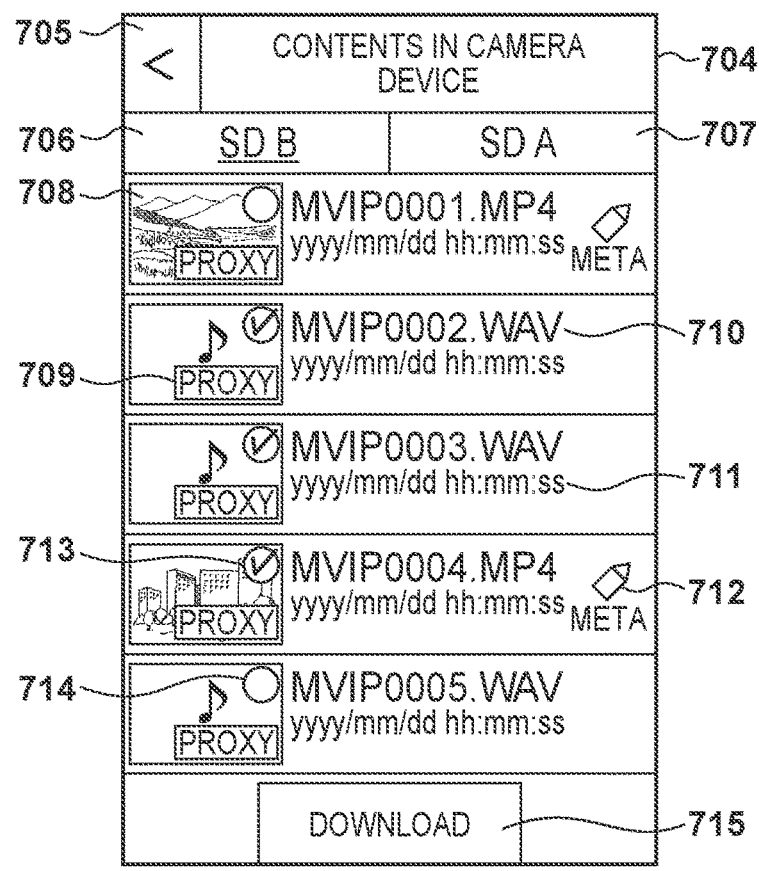
FIG. 7B is a diagram illustrating an example of a display screen of the transfer app run on the communication device 200.

FIG. 7B illustrates an example of a file list display screen 704 displayed when the button 702 is tapped. A return button 705 is a button for returning to the function selection screen 701. Medium selection buttons 706 and 707 are buttons for selecting the media or slots for which lists are to be displayed in a case where the two recording media 110 and 111 are mounted in the image capture apparatus 100 and are readable. The example in FIG. 7B illustrates a state in which SD B (the recording medium 111) is selected, and a list of the image data files (including the audio data files associated with the moving image data files) stored in the recording medium 111 is displayed.

In the present embodiment, when displaying a list for each recording medium, the recording medium (or slot) in which proxy content is stored is prioritized, and thus SD B is selected here. When the medium selection button 707 is selected in this state, a list of image data files stored in SD A (the recording medium 110) is displayed. Note that the format of the data files displayed in the list (such as the extension) may be changed through the settings.

A thumbnail image 708, a filename (including the extension) 710, a recording start date/time 711, and an icon 713 or 714 indicating the selection state are displayed for each of the data files in the list display. The thumbnail image 708 of the moving image data file may be a thumbnail image recorded in the file. The thumbnail image 708 of the audio data uses an image indicating that the audio data is already stored in the non-volatile memory 203. The icon 713 is displayed for a data file which is selected, and the icon 714 is displayed for a data file which is unselected. For example, each time the region in which the information of an individual data file is displayed is tapped, the data file is switched between being selected and unselected, and the display of the icons 713 and 714 switches accordingly.

An icon 709 is displayed superimposed on the thumbnail image 708 for a data file pertaining to proxy content. In the present embodiment, the display control function 302 handles a data file in which the fourth character of the filename is a "P" as a data file pertaining to proxy content, and adds the icon 709 thereto. However, the proxy content may be identified through another method, such as referring to information indicating whether the data file is main content or proxy content if such information is written in the header of the data file, for example. In the example in FIG. 7B, all of the data files are determined to be data files pertaining to proxy content.

An icon 712 indicating a moving image data file for which a metadata file is present in the same recording medium is displayed as well. Here, the icon 712 is assumed to be added to a moving image data file which has the same filename aside from the extension and for which a file having an extension "XML" is present. The presence or absence of a corresponding metadata file may be identified through another method as well.

A download button 715 is a button for providing the control unit 201 with an instruction to download a data file selected in the list display screen 704 from the image capture apparatus 100 to the communication device 200. Upon detecting the download button 715 being operated (tapped), the control unit 201 (data obtaining means) obtains a data file selected in the list display screen 704 from the image capture apparatus 100. The control unit 201 (transfer means) first records the obtain data file in the recording medium 207, or stores the data file in the work memory 204, and then transfers the data file to the information processing device 300. Note that the communication connection with the information processing device 300 can be established at any timing prior to the transfer.

Figure 7C:
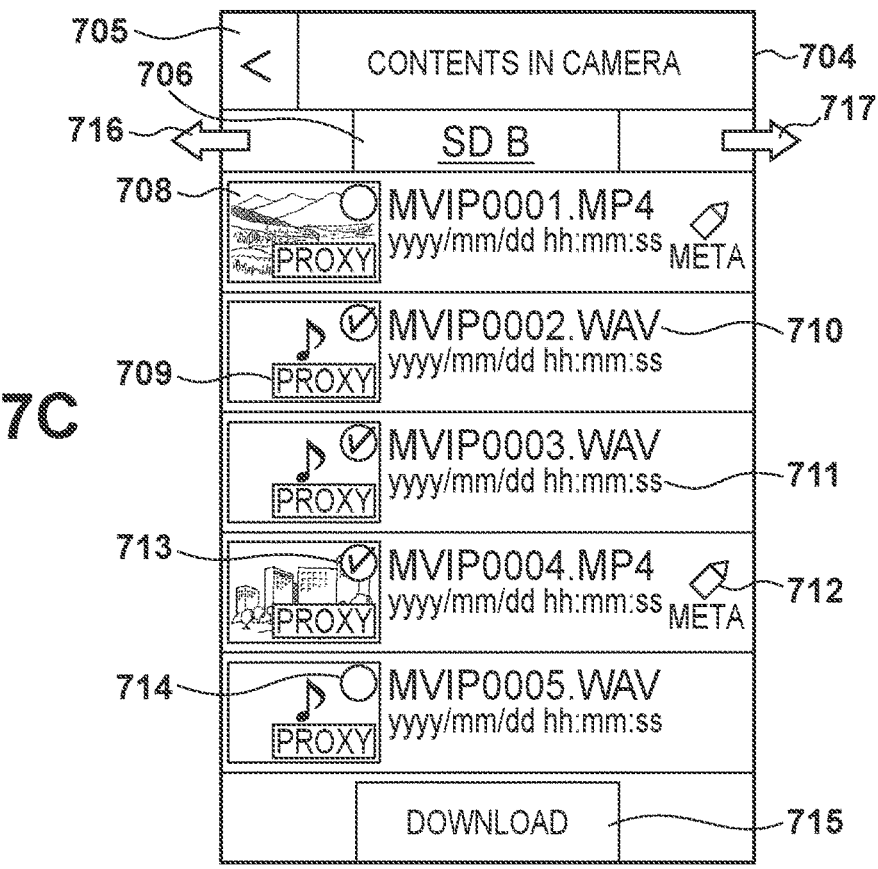
FIG. 7C is a diagram illustrating an example of a display screen of the transfer app run on the communication device 200.

FIG. 7C is a diagram illustrating another example of the list display screen 704. In this example, in a case where the two recording media 110 and 111 are mounted in the image capture apparatus 100 and are readable, only the medium selection buttons for the recording media displayed in the list are displayed. In FIG. 7C, the recording medium 111 is subject to the list display, and thus only the medium selection button 706 is displayed.

The medium selection button 706 can be flicked to the left and right as indicated by arrows 716 and 717. When the medium selection button 706 is flicked to the right or left, the subject of the list display is changed to the recording medium 110. Note that whether the medium selection button displayed can be flicked may be indicated by an icon or the like.

In FIGS. 7B and 7C, when the button 702 is tapped in the function selection screen 701, the list of content in SD B, in which proxy content is recorded, is displayed with priority. In FIG. 7B, the medium selection button 707 is tapped, and in FIG. 7C, the recording medium subject to the list display is switched in response to the medium selection button 706 being flicked, which results in the main content recorded in SD A being displayed in the list.

Figure 7D:
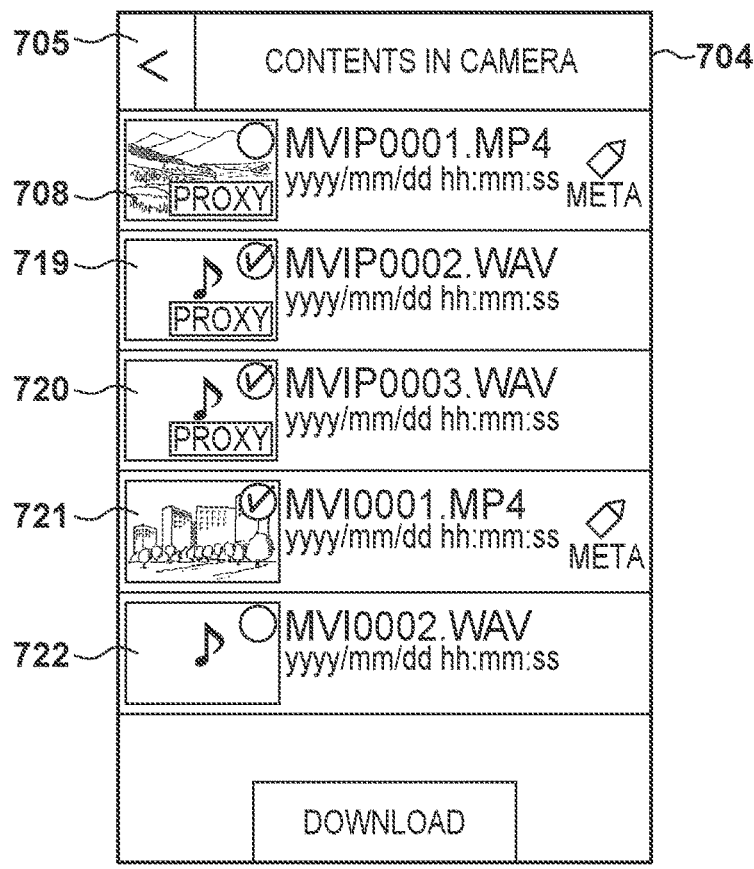
FIG. 7D is a diagram illustrating an example of a display screen of the transfer app run on the communication device 200.

FIG. 7D is a diagram illustrating yet another example of the list display screen 704. In this example, in a case where files recorded in the recording media 110 and 111 of the image capture apparatus 100 are displayed together in a list, files in one of the recording media (slots) are displayed with priority. In FIG. 7D, files 718 to 720 in the recording medium 111 (the sub-slot) are displayed preferentially (with priority), and files 721 to 722 in the recording medium 110 (the main slot) are displayed after the files in the recording medium 111.

In the past, when the file information of an apparatus having a plurality of recording media is displayed in a file transfer application, the main slot is identified based on a volume label, and the file information of the main slot is displayed with priority. The file transfer application has identified, as the main slot, the slot having the volume label (name) that is highest when sorting in ascending order alphabetically or by the order of the Japanese syllabary, for example.

For example, with the image capture apparatus 100 according to the present embodiment, the volume label in the main slot is SD A and the volume label in the sub-slot is SD B, and the file transfer application therefore identifies SD A as the main slot. Note that the items to be sorted may be limited to a part of the volume label in accordance with the regularity of the volume label, or the recording medium to be prioritized may be determined by a method other than sorting. For example, the top three characters ("SD") may be excluded from sorting as long as the volume label is on the image capture apparatus 100. In addition, the main slot may be identified taking into account other conditions, such as giving a volume label starting with "CF" priority over a volume label starting with "SD".

In this manner, a configuration that always displays file information having given priority to the main slot among a plurality of slots (recording media) may not suit the user's needs. For example, in a case where the user is more concerned with the need to report events quickly, it is desirable to display the information in the proxy content with priority. The image capture apparatus 100 according to the present embodiment has settings for recording main content in a main slot and proxy content in a sub-slot. In such a case, in order for the information of the proxy content to be displayed in the communication device 200, it is necessary for the user to switch the recording medium (slot) for which the list is to be displayed to the sub-slot. In addition, if information on the files in the sub-slot is not yet obtained, the information will be obtained in response to a switching instruction, and it may therefore take some time for the list to be displayed.

In the present embodiment, in order to solve such problems with the conventional techniques, the recording medium (slot) for which the file information is to be displayed with priority is determined in accordance with the type of content recorded therein.

Figure 8:
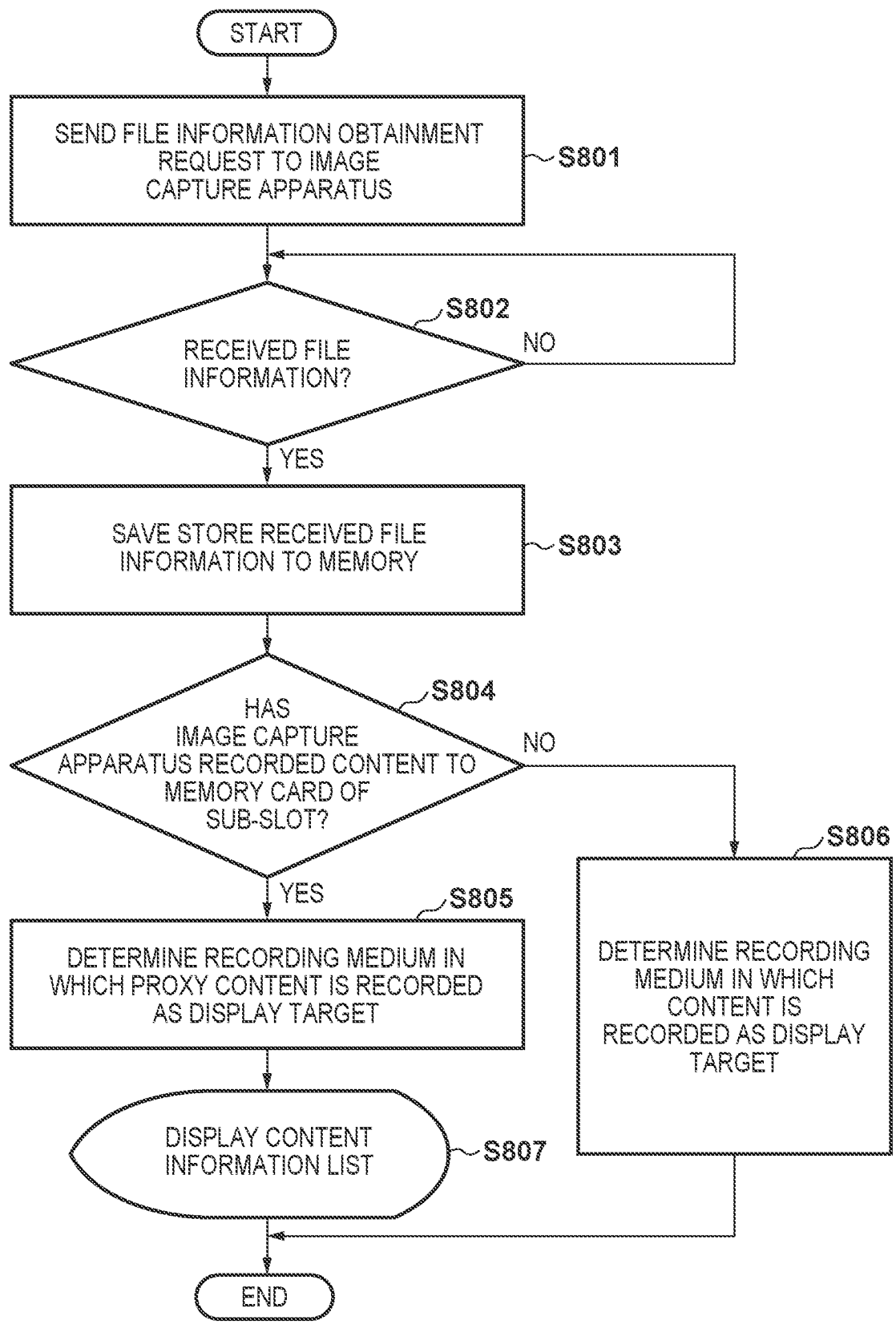
FIG. 8 is a flowchart pertaining to operations of the communication device 200.

FIG. 8 is a flowchart pertaining to operations of the transfer app 301 according to the present embodiment in a state where a communication connection is established between the communication device 200 and the image capture apparatus 100. The operations illustrated in FIG. 8 can be started by, for example, detecting the button 702 being operated (tapped) when the transfer app 301 has been launched and the function selection screen 701 illustrated in FIG. 7A is displayed.

In S801, the control unit 201 (information obtaining means) sends a file information obtainment request, which requests the information of individual recorded files, to the image capture apparatus 100 through the communication unit 211. Note that in a case where the image capture apparatus 100 has a plurality of recording media, the control unit 201 requests the file information for each of the individual recording media. The file information can include a filename, a file format, a recording date/time, a recording duration, a thumbnail image, and the like, but is not limited thereto. To simplify the descriptions and facilitate understanding, it is assumed here that all necessary file information is obtained in a single request. However, file information for a single file may be obtained through a plurality of requests and responses.

In S802, the control unit 201 determines whether the file information sent from the image capture apparatus 100 in response to the file information obtainment request sent in S801 has been received. The control unit 201 executes S803 if it is determined that the file information has been received, and executes S802 again if it is not determined that the file information has been received.

In S803, the control unit 201 receives the file information sent by the image capture apparatus 100 through the communication unit 211, and stores the file information in the work memory 204.

In S804, the control unit 201 determines whether content files are recorded in a plurality of recording media based on the file information stored in the work memory 204. The control unit 201 can specify a main content file and a proxy content file based on the filename, extension, and the like as described above, for example.

If it is determined that there is only one recording medium in which the content files are recorded, the control unit 201 executes S806. In S806, the control unit 201 determines to display a list for the recording medium in which the content files are recorded, and then executes S807.

On the other hand, if it is determined that the content files are recorded in a plurality of recording media, the control unit 201 executes S805. In S805, the control unit 201 determines to display a list for the recording medium in which proxy content files are recorded, and then executes S807.

In S807, the control unit 201 (display control means) displays the list display screen 704, in which is displayed a list of the information of the content files recorded in the recording medium determined for display in S805 or S806.

As a result, if the main content files and the proxy content files are recorded in separate recording media so as not to be mixed, the list is displayed for the recording medium in which the proxy content files are recorded (the sub-slot, in the example in FIG. 6). Accordingly, the control unit 201 displays the list display screen 704 such as that illustrated in FIG. 7B or FIG. 7C.

Note that if there is only one recording medium in which content files are recorded, and the main content files and the proxy content files are recorded in the same recording medium, the control unit 201 displays the list of proxy content files with priority. In addition, if the main content files and the proxy content files are recorded in a mixed state in both of the recording media, the control unit 201 displays the list of proxy content files with priority. In these cases, the control unit 201 can display the list such that the proxy content files are displayed with priority over the main content files, as illustrated in FIG. 7D, for example.

FIG. 9 is a flowchart pertaining to operations by the image capture apparatus 100, corresponding to operations by the communication device 200 described with reference to FIG. 8.

In S901, the control unit 101 receives the file information obtainment request sent from the communication device 200 through the communication unit 112.

In S902, the control unit 101 determines whether the recording medium for which the file information has been requested is normal (can be read), and records a result of the determination in the work memory 104.

In S903, the control unit 101 stores the file information stored in the recording medium determined to be readable in S902 in the work memory 104.

In S904, the control unit 101 transmits the file information saved in the work memory 104 to the communication device 200 through the communication unit 211. Note that if the recording medium has not been determined to be normal in S902, the control unit 201 returns an error instead of the file information for the recording medium.

In this manner, according to the present embodiment, the communication device 200 can display a list of proxy content which, among the content files recorded in the image capture apparatus 100, are suited to situations where there is a need to transfer the content immediately. At this time, the user does not need to be aware of the rules by which the image capture apparatus 100 records the main content files and the proxy content files into one or more recording media. This eliminates the need for operations for displaying the proxy content files, and makes it possible to further reduce the time required for transferring the proxy content files to the information processing device 300.

<Variations>

If there are a plurality of recording media in which main content files and proxy content files are mixed, the list may be displayed for the recording medium having the highest proportion of proxy content files.

Additionally, the foregoing embodiment described a configuration in which the list of proxy content files for which there is a need to transfer the files immediately is displayed with priority. However, the user may be able to select whether the main content files or the proxy content files should be displayed with priority in the list. In this case, the type of the content file (main or proxy) to be displayed with priority, as selected by the user, is stored, and the transfer app displays the content files corresponding to the stored type with priority at the next startup.

The image capture apparatus 100 may also send a recording rule for the content to the communication device 200 in device information, for example. Through this, the control unit 201 can recognize how the main content files and the proxy content files are recorded in the image capture apparatus 100. This makes it possible for the control unit 201 to make an appropriate request for the information on the content files to be displayed in a list to the image capture apparatus 100.

According to the present invention, a communication apparatus, and a method of controlling the same, which is capable of obtaining image files from an image capture apparatus, and which improves usability, can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device comprising:
one or more processors that execute a program stored in a memory and thereby function as:
an information obtaining unit configured to obtain, from a first external device in which a plurality of image data files are recorded, information on the plurality of image data files;
a display control unit configured to provide a screen in which the information on the plurality of image data files is displayed in a selectable manner;
a data obtaining unit configured to obtain, from the first external device, an image data file for which the information has been selected in the screen; and
a transfer unit configured to transfer the image data file obtained to a second external device different from the first external device,
wherein in a case where the plurality of image data files includes one or more main content files and one or more proxy content files, each of which is a reduced-size version of one of the one or more main content files, the display control unit displays the information on the one or more proxy content files in the screen with priority over the information on the one or more main content files,
wherein in a case where the one or more main content files and the one or more proxy content files are recorded in separate recording media so as not to be mixed in a same recording medium, the display control unit displays, in the screen, the information for the recording medium in which the one or more proxy content files are recorded, and
wherein in a case where the one or more main content files and the one or more proxy content files are recorded in a same recording medium, the display control unit displays the information on the plurality of image data files as a list in the screen in which the information on the one or more proxy content files is displayed with priority over the information on the one or more main content files.

2. The communication device according to claim 1, wherein the screen is configured to allow a user to switch the recording medium for which the information is to be displayed.

3. The communication device according to claim 1, wherein in a case where one or more of the one or more main content files and one or more of the one or more proxy content files are recorded in each of a plurality of recording media, the display control unit displays the information on the plurality of image data files of a recording medium for which a proportion of proxy content files is highest, among the plurality of recording media, as a list in the screen in which the information on the one or more of the one or more proxy content files is displayed with priority over the information on the one or more of the one or more main content files.

4. The communication device according to claim 1, wherein the display control unit identifies the one or more main content files and the one or more proxy content files based on the information on the plurality of image data files.

5. The communication device according to claim 1, wherein the display control unit recognizes how the one or more main content files and the one or more proxy content files are recorded based on a recording rule obtained from the first external device.

6. The communication device according to claim 1, wherein in a case where the plurality of image data files include the one or more main content files and the one or more proxy content files, which of the information on the one or more proxy content files and the one or more main content files is to be displayed in the screen with priority is selected by a user.

7. The communication device according to claim 1, wherein each of the one or more proxy content files is a smaller data size version of a corresponding main content file.

8. A method of controlling the communication device, comprising:
    obtaining, from a first external device in which a plurality of image data files are recorded, information on the plurality of image data files;
    providing a screen in which the information on the plurality of image data files is displayed in a selectable manner;
    obtaining, from the first external device, an image data file for which the information has been selected in the screen; and
    transferring the image data file obtained to a second external device different from the first external device,
    wherein the providing comprises, in a case where the plurality of image data files includes one or more main content files and one or more proxy content files, each of which is a reduced-size version of one of the one or more main content files, providing the screen in which the information on the one or more proxy content files is displayed with priority over the information on the one or more main content files,
    wherein in a case where the one or more main content files and the one or more proxy content files are recorded in separate recording media so as not to be mixed in a same recording medium, the providing comprises providing the screen in which the information for the recording medium in which the one or more proxy content files are recorded is displayed, and
    wherein in a case where the one or more main content files and the one or more proxy content files are recorded in a same recording medium, the providing comprises providing the screen in which the information on the plurality of image data files is displayed as a list in which the information on the one or more proxy content files is displayed with priority over the information on the one or more main content files.

9. A non-transitory computer-readable medium that stores a program which, when executed by one or more processors of a communication device, causes the one or more processors to perform a method of controlling the communication device, comprising:
    obtaining, from a first external device in which a plurality of image data files are recorded, information on the plurality of image data files;
    providing a screen in which the information on the plurality of image data files is displayed in a selectable manner;
    obtaining, from the first external device, an image data file for which the information has been selected in the screen; and
    transferring the image data file obtained to a second external device different from the first external device,
    wherein the providing comprises, in a case where the plurality of image data files includes one or more main content files and one or more proxy content files, each of which is a reduced-size version of one of the one or more main content files, providing the screen in which the information on the one or more proxy content files is displayed with priority over the information on the one or more main content files,
    wherein in a case where the one or more main content files and the one or more proxy content files are recorded in separate recording media so as not to be mixed in a same recording medium, the providing comprises providing the screen in which the information for the recording medium in which the one or more proxy content files are recorded is displayed, and
    wherein in a case where the one or more main content files and the one or more proxy content files are recorded in a same recording medium, the providing comprises providing the screen in which the information on the plurality of image data files is displayed as a list in which the information on the one or more proxy content files is displayed with priority over the information on the one or more main content files.

10. A communication device that communicates with an image capture apparatus that records content files into a first recording medium with priority over a second recording medium, the communication device comprising:
    one or more processors that execute a program stored in a memory and thereby function as:
    a display unit configured to, when displaying content recorded in the first recording medium and the second recording medium, display a content recorded in the first recording medium with priority over a content recorded in the second recording medium.

11. A method for controlling a communication device that communicates with an image capture apparatus that records content files into a first recording medium with priority over a second recording medium, comprising:
    displaying, when displaying content recorded in the first recording medium and the second recording medium, a content recorded in the first recording medium with priority over a content recorded in the second recording medium.

12. A non-transitory computer-readable medium that stores a program which, when executed by one or more processors of a communication device, causes the one or more processors to perform a method of controlling the communication device, comprising:
    displaying, when displaying content recorded in the first recording medium and the second recording medium, a content recorded in the first recording medium with priority over a content recorded in the second recording medium.

* * * * *